(12) United States Patent
Thakore

(10) Patent No.: US 8,180,730 B2
(45) Date of Patent: May 15, 2012

(54) ARBITRATION TOKEN FOR MANAGING DATA INTEGRITY AND DATA ACCURACY OF INFORMATION SERVICES THAT UTILIZE DISTRIBUTED DATA REPLICAS

(75) Inventor: Arun Kumar Thakore, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/277,716

(22) Filed: Nov. 25, 2008

(65) Prior Publication Data

US 2010/0131468 A1    May 27, 2010

(51) Int. Cl.
*G06F 7/00* (2006.01)
(52) U.S. Cl. .................. 707/618; 707/626; 707/634
(58) Field of Classification Search .................. 707/609, 707/610, 615, 618, 626, 633, 634
See application file for complete search history.

(56) References Cited

U.S. PATENT DOCUMENTS

| | | | |
|---|---|---|---|
| 5,446,871 A | 8/1995 | Shomler et al. | |
| 5,515,537 A * | 5/1996 | Tavares et al. | 710/244 |
| 5,884,308 A | 3/1999 | Foulston | |
| 7,118,282 B2 | 10/2006 | Onogawa et al. | |
| 7,155,463 B1 * | 12/2006 | Wang et al. | 707/634 |
| 7,171,379 B2 | 1/2007 | Menninger et al. | |
| 7,181,572 B2 | 2/2007 | Walmsley | |
| 7,191,290 B1 * | 3/2007 | Ackaouy et al. | 711/119 |
| 7,254,608 B2 | 8/2007 | Yeager et al. | |
| 7,260,716 B1 | 8/2007 | Srivastava | |
| 7,275,102 B2 | 9/2007 | Yeager et al. | |
| 7,278,697 B2 | 10/2007 | Plunkett | |
| 7,289,964 B1 | 10/2007 | Bowman-Aumah | |
| 7,290,056 B1 | 10/2007 | McLaughlin, Jr. | |
| 7,328,243 B2 | 2/2008 | Yeager et al. | |
| 7,334,154 B2 | 2/2008 | Lorch et al. | |
| 7,337,191 B2 | 2/2008 | Haeberle et al. | |
| 7,340,500 B2 | 3/2008 | Teaversat et al. | |
| 2004/0205152 A1 * | 10/2004 | Yasuda et al. | 709/217 |
| 2009/0049107 A1 * | 2/2009 | Yamaguchi et al. | 707/201 |
| 2009/0063587 A1 * | 3/2009 | Jakob | 707/203 |

OTHER PUBLICATIONS

Zhou et al., "A Token-Based Independent Update Protocol for Managing Replicated Objects", International Journal of Computer Systems Science & Engineering, vol. 17, No. 3, May 2002, pp. 189-207.

\* cited by examiner

*Primary Examiner* — Amy Ng
(74) *Attorney, Agent, or Firm* — Yee & Associates, P.C.; John R. Pivnichny

(57) ABSTRACT

Illustrative embodiments present a computer-implemented method for controlling update of stored data in a set of data replicas. The computer-implemented method responsive to receiving a data request from a requester, identifies a data replica to resolve the data request to form an identified data replica. The computer-implemented method transmits an update data request to a replica administration agent if the data request is an update data request, determines whether an arbitration token is present, and responsive to a determination that the arbitration token is present; a replica administration agent updates the data in the identified data replica.

17 Claims, 8 Drawing Sheets

| ARBITRATION TOKEN 500 | DATA REPLICA IDENTIFIER COLUMN 502 | DATA REPLICA ORDER COLUMN 504 | QUALITY OF SERVICE TIME DELAY COLUMN 506 | DATA REPLICA WEIGHT COLUMN 508 |
|---|---|---|---|---|
| | DATA REPLICA 1 | 1 | $T_1$ | $W_1$ |
| | DATA REPLICA 2 | 2 | $T_2$ | $W_2$ |
| | ⋮ | ⋮ | ⋮ | ⋮ |
| | DATA REPLICA N | N | $T_N$ | $W_N$ |
| | 510 | | 512 | 514 |

FIG. 5

$$\text{UPDATE TIME WINDOW FOR DATA REPLICA N} = \frac{\text{QOS TIME DELAY }(T_N) \times \text{DATA REPLICA WEIGHT }(W_N)}{(\text{DATA REPLICA WEIGHT OF HIGHEST WEIGHTED DATA REPLICA})}$$

FIG. 6

ARBITRATION TOKEN FOR MANAGING DATA INTEGRITY AND DATA ACCURACY OF INFORMATION SERVICES THAT UTILIZE DISTRIBUTED DATA REPLICAS

BACKGROUND OF THE INVENTION

1. Field of the Invention

The present invention relates generally to an improved data processing system and in particular, to a method and apparatus for managing data. Still more particularly, the present invention relates to a computer-implemented method, apparatus, and computer program product for controlling an update of stored data in a set of data replicas using an arbitration token.

2. Description of the Related Art

Service-Oriented Architecture (SOA) has been used in providing an abstracted and virtualized view of corporate data by means of information services (IS). Information services hide the details associated with the location, structure, and implementation of the various data sources within a given domain and allow the clients to access data in a neutral fashion. The clients and data sources are typically dispersed across various geographies.

In order to ensure high data availability and low response time for information services in such a virtualized and distributed environment, data is often replicated across geographic locations. Many variations of data replication are typically used. The replication configuration that offers the highest amount of data availability and shortest response time involves replicating the same data in various locations and allowing the clients to read from and update to the replica closest to them. Such a replication typically causes data integrity and data accuracy to be compromised. Since many clients are potentially updating the replicas, same data can be potentially updated in parallel, compromising the integrity of the underlying data. Also, when a client reads the data, the client may potentially get stale data if the other clients have updated other replicas and the updated information is not replicated in time to the local replica.

Typical solutions either restrict the type of access allowed at the replicas or restrict the amount of replication allowed. Some solutions allow the data to be updated at the master replica while only allowing read access at the other local replicas. Other solutions permit the clients to read outdated data while providing a capability to make the data current at a specific location within a certain time frame after the data has been updated at another location. Thus, these solutions restrict flexibility.

BRIEF SUMMARY OF THE INVENTION

According to one embodiment of the present invention, a computer-implemented method for controlling update of stored data in a set of data replicas is presented. The computer-implemented method responsive to receiving a data request from a requester, identifies a data replica to resolve the data request to create an identified data replica. The computer-implemented method further transmits the update data request to a replica administration agent if the data request is an update request. The computer-implemented method determines whether an arbitration token is present and responsive to a determination that the arbitration token is present updates the data of the identified data replica by the replica administration agent.

In another embodiment of the present invention, a data processing system for controlling update of stored data in a set of data replicas is presented. The data processing system comprises a bus, a memory connected to the bus, wherein the memory contains computer-executable instructions, a processor unit, connected to the bus, wherein the processor unit executes the computer-executable instructions to direct the data processing to respond to receiving a data request from a requester, by identifying a data replica to resolve the data request to create an identified data replica, and transmit an update data request to a replica administration agent if the data request is an update data request. The processor unit executes the computer-executable instructions to further direct the data processing to determine whether an arbitration token is present, and responsive to a determination that the arbitration token is present, update the data of the identified data replica by the replica administration agent.

In another embodiment of the present invention, a computer program product for controlling update of stored data in a set of data replicas is presented. The computer program product comprises a computer-readable medium containing computer-executable instructions stored thereon, the computer-executable instructions comprising computer-executable instructions responsive to receiving a data request from a requester, for identifying a data replica to resolve the data request to create an identified data replica, and computer-executable instructions for transmitting the update data request to a replica administration agent if the data request is an update data request. The computer program product further comprises computer-executable instructions for determining whether an arbitration token is present, and computer-executable instructions responsive to a determination that the arbitration token is present, for updating the data of the identified data replica by the replica administration agent.

BRIEF DESCRIPTION OF THE SEVERAL VIEWS OF THE DRAWINGS

FIG. 5 is a block diagram of an arbitration token of FIG. 3, in accordance with an illustrative embodiment;

FIG. 6 is an equation for calculating an update time window, for use with the arbitration token of FIG. 3, in accordance with an illustrative embodiment;

DETAILED DESCRIPTION OF THE INVENTION

Figure 1:
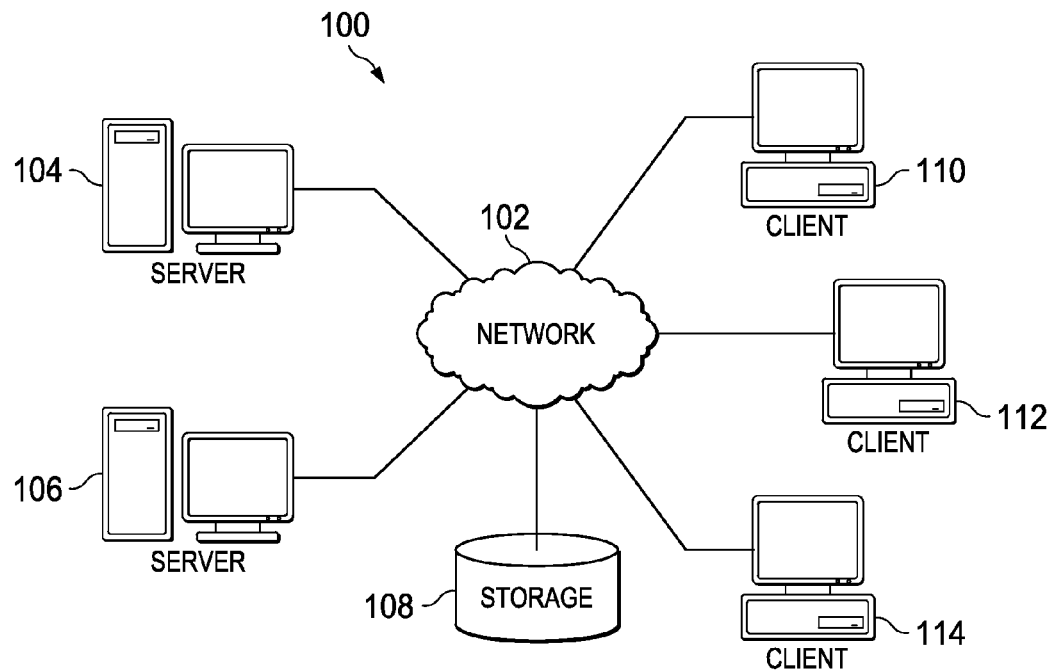
FIG. 1 is a pictorial representation of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including, but not limited to wireless, wireline, optical fiber cable, RF, etc.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer-implemented process such that the instructions which execute on the computer, or other programmable apparatus, provide processes for implementing the functions/acts specified in the flowchart and/or block diagram block or blocks.

Figure 2:
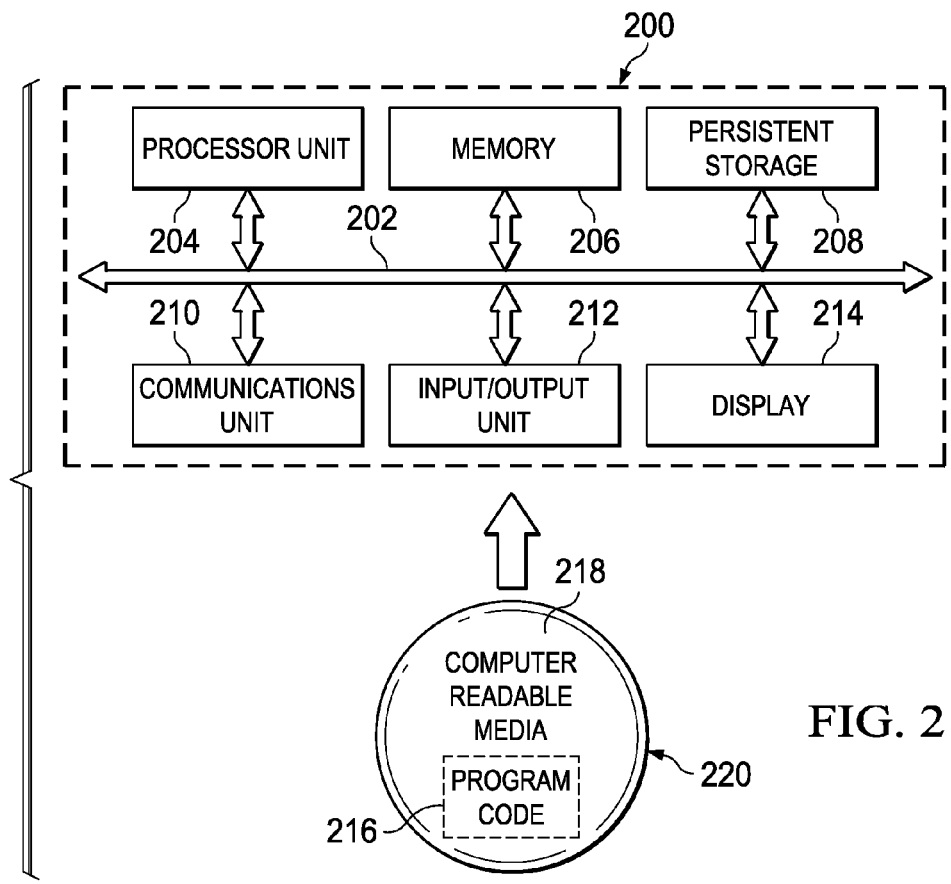
FIG. 2 is a block diagram of a data processing system in which illustrative embodiments may be implemented.

With reference now to the figures, and in particular, with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. In an illustrative example, server 104 and server 106 provide a set of data replicas hosting stored data for access by clients 110, 112, and 114. The data replicas may be located on a server however data replicas are typically geographically dispersed. In addition, server 106 hosts an information service provider and administration server for controlling the update of data stored in server 104 and server 106. There can be more than one information service provider as in a set of information service providers. The information service providers may be located on servers separate from data replicas and other information service providers as well. In particular, the administration server initializes an arbitration token and sends the arbitration token to a data replica. The information service provider receives requests from clients 110, 112, and 114 for access to the data stored on server 104. The information service provider then identifies a data replica for satisfying the requests. Read requests are serviced without delay. Write requests for updating data stored on the identified data replica of server 104 may be performed only when the identified data replica is in possession of the arbitration token. After data stored on the identified data replica has been updated, all data replicas, such as those dispersed on server 104 and server 106 receive copies of the updates written to the identified data replica. The arbitration token is then passed to the next data replica.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Using the example of system 100 of FIG. 1, a computer-implemented method for controlling update of stored data in a set of data replicas, may be described. For example a data request from a requester, such as client 110 may be received over the network 102 by an information service provider on server 106 for data residing on a data replica identified as located on server 104.

When the data request is an update data request, the update data request is transmitted to a replica administration agent on server 104 that determines whether an arbitration token is present in the data request and if the arbitration token is present updating the data for the identified data replica. The arbitration controls the amount time a data replica is permitted to perform the write operation of the update data request.

Upon receiving confirmation from the replica administration agent; the information service provider on server 106 forwards the confirmation to the requester on client 110. The replica administration agent also forwards a copy of the written updates to other data replicas in a set of data replicas that may be located on server 104, server 106 or other servers. In addition the replica administration agent transmits the arbitration token to a next data replica in accordance with a sequence in the arbitration token. The described process and components thus provide a capability to control the update of stored data in a set of data replicas. With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of processors. As used herein, the term "set" may refer to one or more. Thus, a set of processors may be one or more processors. In addition, processor unit 204 may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. A storage device is any hardware device that is capable of storing data, information, and/or program code. Persistent storage 208 may take various forms, depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer-implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-readable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
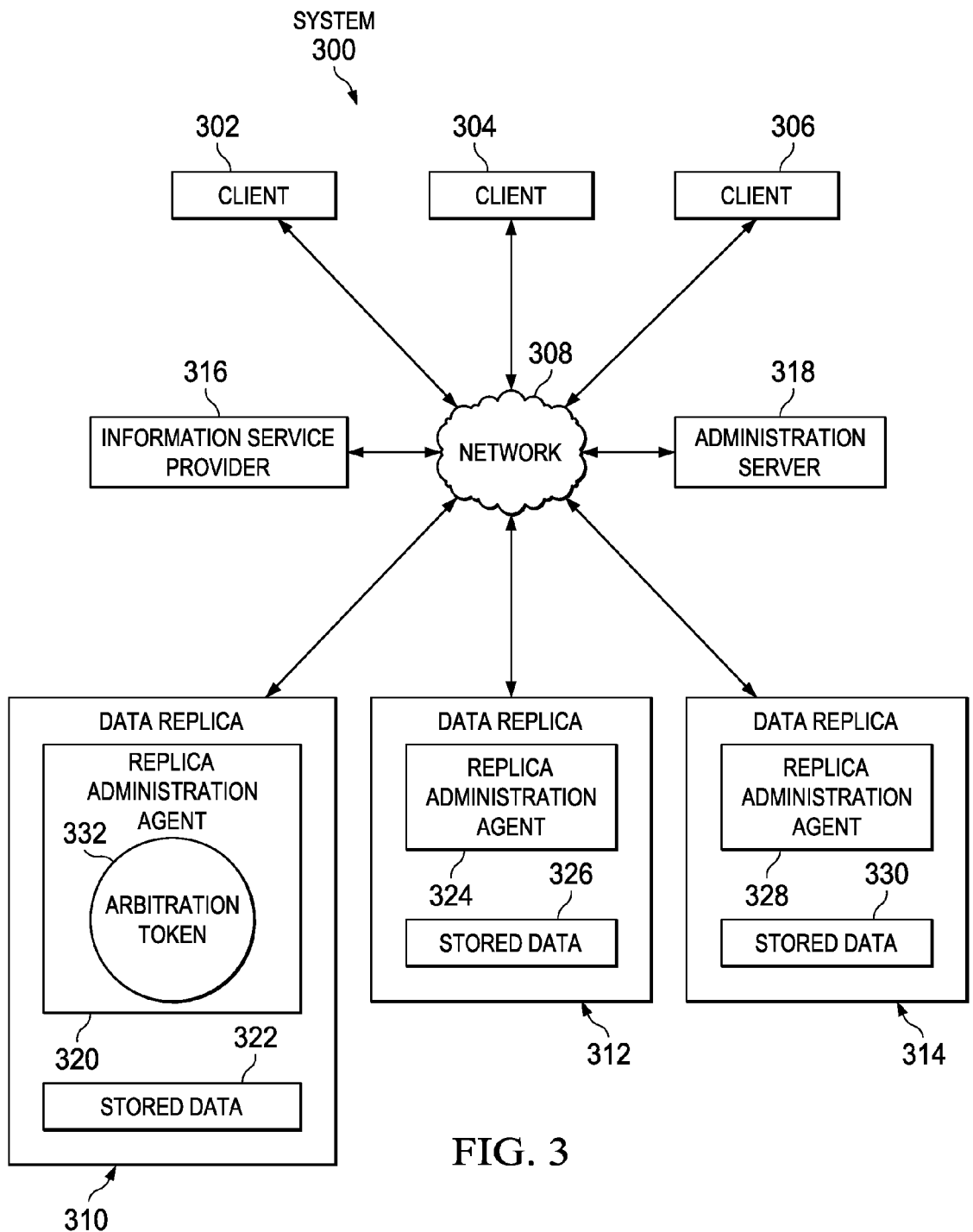
FIG. 3 is a block diagram of a system for controlling the update of data stored in a set of data replicas in accordance with an illustrative embodiment.

With reference to FIG. 3, a block diagram of a system for controlling the update of data stored in a set of data replicas in accordance with an illustrative embodiment is presented. System 300 is an example of a set of data replicas of a networked data processing system such as networked data processing system 100 in FIG. 1. The set of data replicas includes one or more data replicas. System 300 includes clients 302, 304, and 306 which may be representative of clients 110, 112, and 114 in FIG. 1.

Clients of system 300 interface with network 308 for accessing data stored in a set of data replicas. The set of data replicas may contain one or more data replicas. Network 308 is a network such as network 102 in FIG. 1. The set of data replicas connected to network 308 include data replica 310, 312 and 314. Data replica 310, 312, and 314 are computing devices configured for storing and managing data accessible to client 302, 304, and 306. In addition, data replica 310, 312, and 314 may be located in different geographic locations.

Requests for data generated by a client are directed to information service provider 316. Information service provider 316 may be implemented as hardware, software or a combination of hardware and software for controlling access to data stored in the set of data replicas. In particular, information service provider 316 identifies a data replica for satisfying a request from a client. Information service provider 316 may select a data replica based upon proximity of the data replica to the requesting client. Other criteria that information service provider 316 may use to select a data replica for satisfying a data request may include, without limitation, an amount of data traffic directed to a particular data replica, a data replica weight as explained later with regard to arbitration token 500 in FIG. 5, a threshold update time window, or a data replica having data that satisfies the data request. An update time window is a length of time allowed to update data stored in a data replica. The update time window is calculated using an update time window equation, such as update time window equation 600 in FIG. 6.

After identifying a data replica for satisfying a client request, information service provider 316 may provide access to the requested data from the identified data replica. Requests by a client to update data stored in data replicas are controlled by replica administration agents, such as replica administration agents 320, 324, and 328. Requests for data by a client of system 300 may be directed to the data replica that is the closest to the requesting client.

Each data replica in system 300 includes a replica administration agent. For example, data replica 310 includes replica administration agent 320. Replica administration agent 320 is a software application for performing administrative functions at data replica 310. For example, replica administration agent 320 receives data requests from information service provider 318, retrieves data from stored data 322 of data replica 310 and sends results back to the information service provider 318. Replica administration agent 320 also updates stored data, sends arbitration token 332 and broadcasts written updates to other data replicas. Replica administration agents 324 and 328 are replica administration agents, such as replica administration agent 320.

Stored data 322, 326, and 330 is data maintained for access by client 302, 304, and 306. Stored data 322, 326, and 330 are located in data replicas 310, 312, and 314, respectively. Stored data 322, 326, and 330 may be synchronized copies of the same data. Requests by clients 302, 304, and 306 to read data stored in a data replica may be serviced without delay. Write requests for updating stored data may only be performed when a data replica is in possession of arbitration token 332.

Arbitration token 332 is a data structure that controls the update of stored data in a data replica. In an illustrative embodiment, arbitration token 332 includes information comprising a data replica identifier, a data replica order, a quality of service delay and a data replica weight for each data replica of the set of data replicas.

Administration server 318 is a server governing the functionality and availability of data replicas 310, 312, and 314. For example, administration server 318 determines an order in which the data replicas will be updated.

Figure 4:
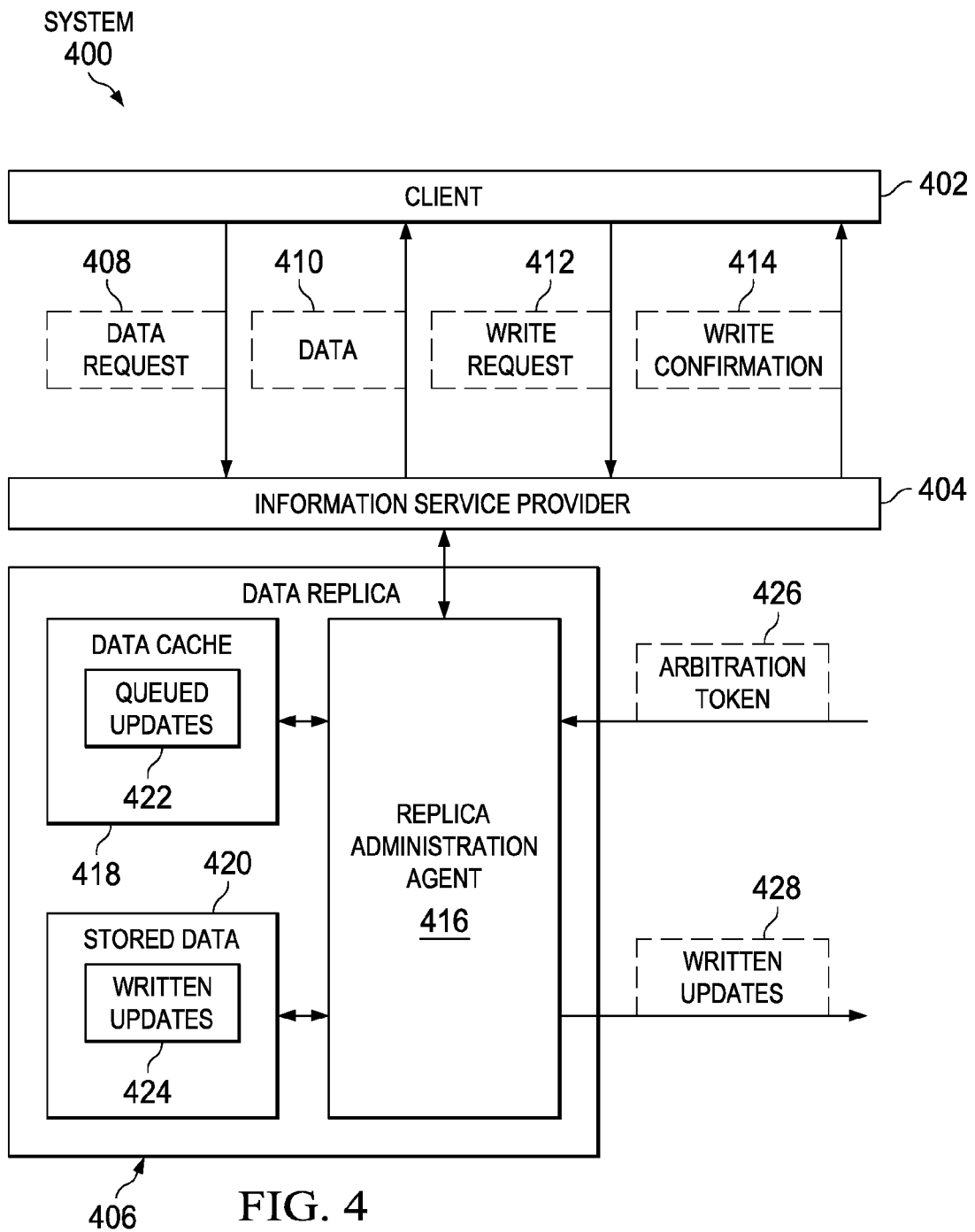
FIG. 4 is a block diagram showing data flow throughout components of a system for controlling an update of stored data in a set of data replicas, representative of the system of FIG. 3, in accordance with an illustrative embodiment.

With reference to FIG. 4, a block diagram showing data flow throughout components of a system for controlling an update of stored data in a set of data replicas, representative of the system of FIG. 3, in accordance with an illustrative embodiment, is presented. System 400 is a combination of hardware and software that is a representative system example of system 300 in FIG. 3. Thus, client 402 is a client such as client 302 in FIG. 3. Similarly, information service provider 404 is an information service provider such as information service provider 316 in FIG. 3. In addition, data replica 406 is a data replica such as data replica 312 in FIG. 3.

Client 402 invokes information service provider 404 to access stored data 420 maintained in data replica 406. Stored data 420 is stored data such as stored data 326 in FIG. 3. In particular, client 402 invokes service provider 404 by generating and transmitting data request 408 to information service provider 404. Data request 408 is a request for data which is generated at client 402. For example, data request 408 may be a read request.

In response to receiving data request 408, information service provider 404 identifies a data replica for satisfying data request 408. In one embodiment, information service provider 404 may identify the data replica that is the closest data replica to client 402 for satisfying data request 408. However, in other embodiments, information service provider 404 may identify a data replica for satisfying data request 408 according to any predefined criteria. The criteria may include, for example, the nearest data replica that is next in line to receive arbitration token 426. Arbitration token 426 is an arbitration token such as arbitration token 332 in FIG. 3.

After identifying data replica 406 for satisfying data request 408, information service provider 404 searches data cache 418 to determine whether data stored in data cache 418 satisfies data request 408. Data cache 418 is a memory storing set of queued updates 422. Set of queued updates 422 is one or more updates of stored data 420. Set of queued updates 422 may be, for example, new data written to data replica administration agent 416. In addition, set of queued updates 422 may include updates for data already stored at data replica 406. If information service provider 404 determines that the data stored in data cache 418 satisfies data request 408, then information service provider 404 retrieves the requested data and returns requested data 410 to client 402. Requested data 410 is data that satisfies data request 408.

If information service provider 404 determines that data stored in data cache 418 does not satisfy data request 408, then information service provider 404 may locate requested data 410 in stored data 420. Information service provider 404 may then return requested data 410 to client 402.

Data requests, such as data request 408 generated by client 402, are serviced without delay. However, information service provider 404 handles write request 412 differently. Write request 412 is a request from client 402 directed to information service provider 404 to write data to stored data 420. Write request 412 may be a request to write new data to stored data 420 or to update existing data in stored data 420. In an illustrative embodiment, information service provider 404 passes write request 412 to replica administration agent 416 when write request 412 is received. If replica administration agent 416 is in possession of arbitration token 426, and data cache 418 is empty, then replica administration agent 416 writes the data embodied in write request 412 into stored data 420 to form written updates 424. Written updates 424 is one or more updates written to stored data 420. Written updates 424 may include data from write request 412. In some instances, written updates 424 may include data from queued updates 422.

Queued updates 422 is a set of one or more updates for updating stored data 420. Queued updates 422 may include write requests generated by client 402 but received by replica administration agent 416 in the absence of arbitration token 426. In addition, queued updates 422 may include copies of written updates from other data replicas, such as copy of written updates 428. Copy of written updates 428 is a copy of written updates 424. Copy of written updates 428 is generated and transmitted by replica administration agent 416 in response to updating stored data 420 with written updates 424. When stored data 422 is updated with written updates 424, copies of the written updates are sent to other data replicas for updating their stored data. For example, in the illustrative example in FIG. 4, replica administration agent 416 updates stored data 420 with written updates 424. In addition, replica administration agent 416 sends copy of written updates 428 to other replica administration agents.

Because data for updating stored data 420 can only be written to stored data 420 when replica administration agent 416 is in possession of arbitration token 426, updates to stored data 420 are maintained in data cache 418 until replica administration agent 416 has permission to write to stored data 420.

In an illustrative embodiment, replica administration agent 416 writes queued updates 422 to stored data 420 in an order in which the update was received. Thus, if replica administration agent 416 receives write request 412 when data cache 418 includes set of queued updates 422, then replica administration agent 416 will write set of queued updates 422 to stored data 420 before replica administration agent 416 updates stored data 420 with the data of write request 412. In the event that replica administration agent 416 is unable to update stored data 420 with write request 412 in the time that replica administration agent 416 is in possession of arbitration token 426, replica administration agent 416 will save write request in data cache 418 as set of queued updates 422.

After data of write request 412 is saved to stored data 420, replica administration agent 416 sends information service provider write confirmation 414. Information service provider 404, in turn, may send write confirmation 414 to client 402. Write confirmation 414 is a message indicating that stored data 420 has been updated with the data embodied in write request 412.

With reference to FIG. 5, a block diagram of an arbitration token in accordance with an illustrative embodiment is presented. Arbitration token 500 is an example of a software component of an arbitration token, such as arbitration token 332 in FIG. 3. In this illustrative example, arbitration token 500 is a table. However, in other embodiments, arbitration token 500 may be any other type of data structure.

Arbitration token 500 includes data replica identifier column 502. Data replica identifier column 502 is a column storing unique identifiers assigned to each data replica of a networked data processing system. For example, system 300 in FIG. 3 includes data replicas 310, 312, and 314. Arbitration token 332 includes a data replica identifier column, such as data replica identifier column 502 having one entry corresponding to each data replica.

Arbitration token 500 also includes data replica order column 504. Data replica order column 504 includes entries corresponding to each data replica identified in data replica identifier column 502. The values stored in data replica order column 504 indicate the order in which arbitration token 500 is passed between the data replicas identified in data replica identifier column 502. A systems administrator may specify an order, or an administration server, such as administration server 318 in FIG. 3, may specify the order.

Quality of service time delay column 506 stores quality of service time delay values. A quality of service time delay value is a parameter that specifies an amount of time that a replica administration agent may possess arbitration token 500. The quality of service time delay value may be a period of time, a percentage, or any other parameter that may be used to specify an amount of time. The quality of service time delay values may be assigned by a systems administrator, or default values may be assigned by an administration server, such as administration server 318 in FIG. 3.

Data replica weight column 508 is a column storing weight values assigned to each data replica. Initial weight values may be assigned by a systems administrator or an administration server. The weight values may change to allow one or more data replicas to possess arbitration token 500 for a longer period of time.

The initial quality of service values stored in quality of service time delay column 506 may be altered in real-time based on an ability of a data replica to complete write requests. Thus, although all data replicas may initially be assigned equal quality of service time delay values, the quality of service time delay value may be altered to allow certain data replicas to possess arbitration token 500 for longer periods of time and thus, accommodate more write requests. For example, a system having two data replicas may have an arbitration token assigning each data replica an equal value for the initial quality of service time delay value. However, if the first data replica receives twice as many write requests over a given period of time, then the quality of service time delay may be increased to accommodate the longer write time required for the affected data replica.

Data replica N 510 represents the $n^{th}$ data replica or last entry in the column. Value 512 represents a quality of service time delay value of "Tn" corresponding to the last data replica entry. Value 514 represents a data replica weight value of "Wn" also corresponding to the last data replica value.

With reference to FIG. 6, an equation for calculating an update time window for use with the arbitration token of FIG. 3, in accordance with an illustrative embodiment, is presented. The equation may be implemented by a replica administration agent, such as replica administration agent 320 in FIG. 3. The equation is used for determining a length of time that the replica administration agent may possess an arbitration token.

The time allotted for update is the update time for a data replica to perform the waiting or requested writes. Element 602 represents the update time for data replica "N." The value of element 602 may be calculated as the product of elements 604 and 606, divided by element 608.

Element 604 represents the quality of service (QOS) time delay for the corresponding data replica, expressed as "Tn" as value 512 of FIG. 5. Element 606 represents the data replica weight associated with data replica "N" expressed as "Wn" as value 514 of FIG. 5. Element 608 represents the data replica weight associated with the data replica having the highest weight in data replica weight column 508 of FIG. 5.

Figure 7:
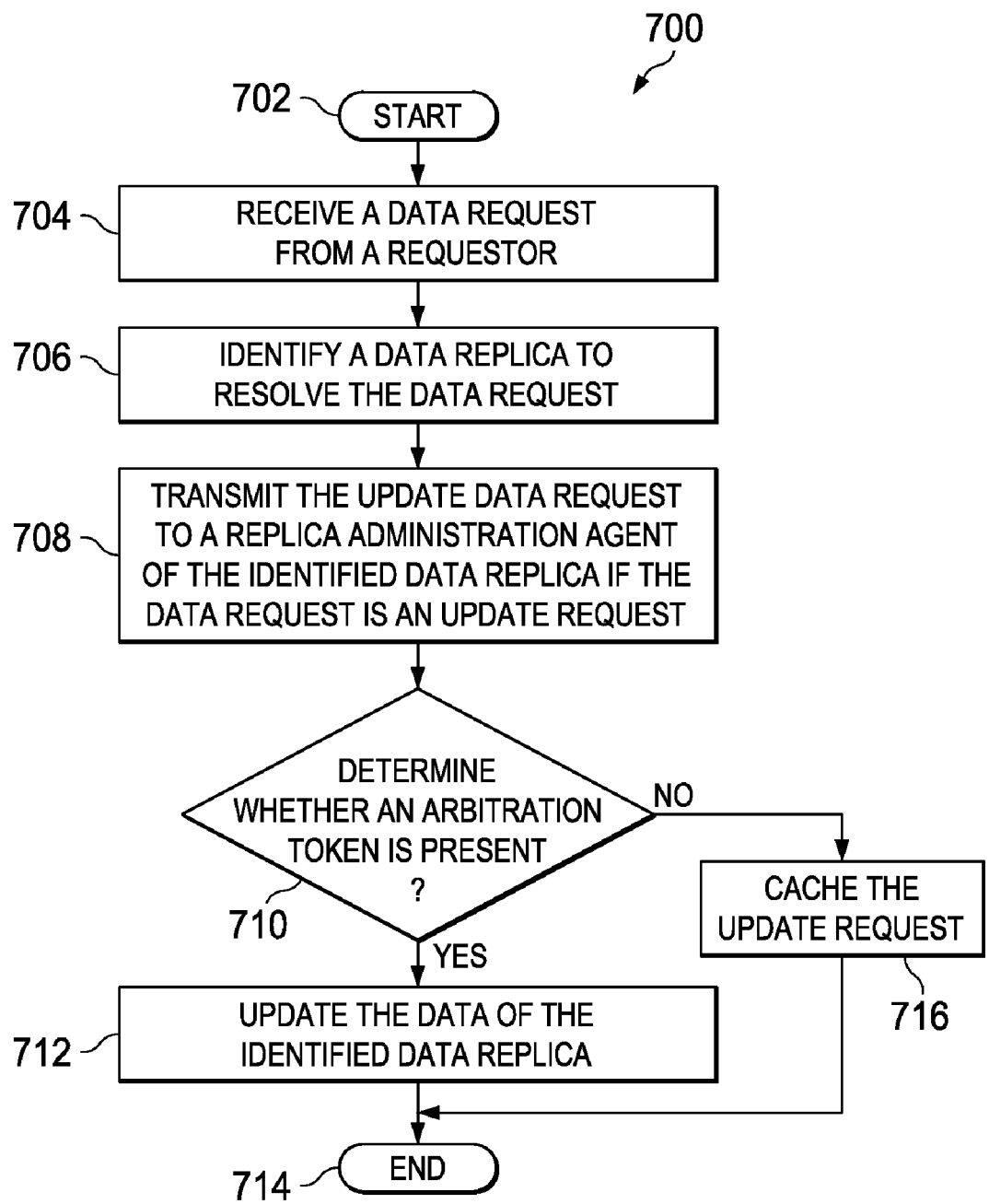
FIG. 7 is a flowchart of a process for updating a data replica, in a set of data replicas, using an arbitration token of FIG. 3, in accordance with an illustrative embodiment.

With reference to FIG. 7, a flowchart of a process for updating a data replica, in a set of replicas, using an arbitration token of FIG. 3, in accordance with an illustrative embodiment is presented. Process 700 is an illustrative example of a process that may be implemented in replica administration agent 320 of system 300 of FIG. 3.

Process 700 begins (step 702) and receives a data request from a requester (step 704). Using the data request, the process identifies a data replica to resolve the data request (step 706). Resolution may be performed by a data type, a request type, a geographic proximity of the data replica or other factors. For example, a data replica physically nearest the requester may be selected, such as the same city or region. In another example, a request for financial data would be directed to a financial data replica as opposed to a general data replica. In another example, a request containing an update of a certain size or number of elements or files may be allocated to specific data replicas first.

The process transmits the update data request to a replica administration agent for the identified data replica if the data request is an update request (step 708). The process determines whether an arbitration token is present to allow performance of a write operation (step 710). The write or update operation can only occur while the replica administration agent on the data replica to be updated has the arbitration token.

When a determination is made that the arbitration token is present, a "yes" result is obtained in step 710. When a determination is made that the arbitration token is not present, a "no" result is obtained. When a "yes" is obtained in step 710, update the data of the identified data replica occurs (step 712), with process 700 terminating thereafter (step 714).

However, when a determination is made that the arbitration token is not present, and a "no" is obtained in step 710, cache the update request is performed (step 716), with process 700 terminating thereafter (step 714). The cached update request will be performed at a later date when write permission is obtained by replica administration agent possessing the arbitration token.

In an embodiment of a process such process 700 of FIG. 7, a capability for controlling update of stored data in a set of data replicas is presented. Responsive to a determination that the data request is an update data request, the process transmits the update data request to a replica administration agent of an identified data replica and responsive to the presence of an arbitration token, updates the data of the identified data replica. Upon completion of the update, a confirmation from the replica administration agent is forwarded to the requester. The updates from one data replica are thus propagated to other data replicas in a predetermined order. The update process is further controlled using an update time window at each data replica to manage time allocated to write updates.

Figure 8:
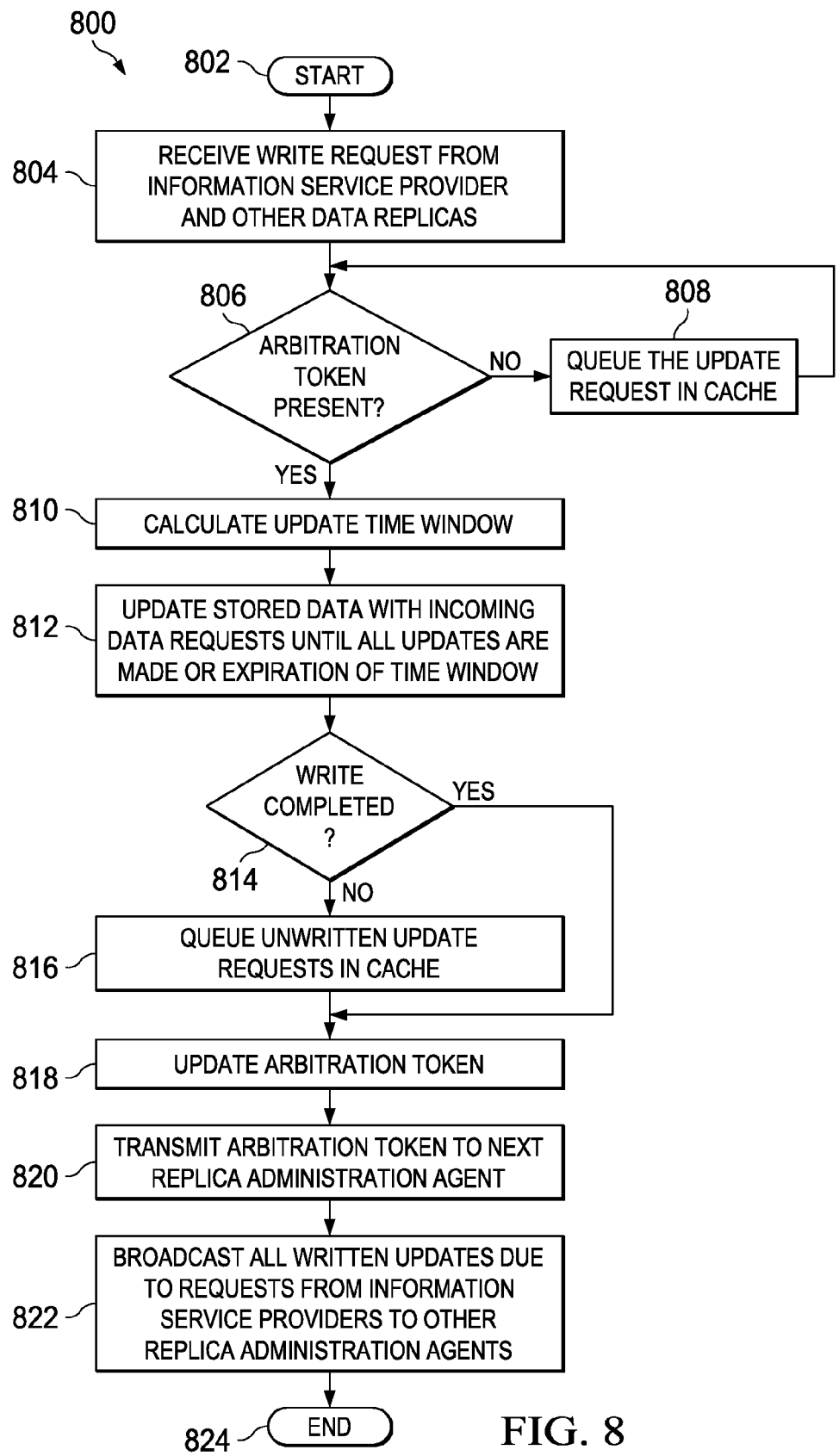
FIG. 8 is a flowchart of a detailed process of FIG. 7, for updating a data replica, in accordance with an illustrative embodiment

With reference to FIG. 8, a flowchart of a detailed process of FIG. 7 for updating a data replica, in accordance with an illustrative embodiment, is presented. The process in FIG. 8 may be implemented in a software component, such as replica administration agent 320 in FIG. 3.

Process 800 begins (step 802) and receives a write request from an information service provider and other data replicas (step 804). The write request may be a write request from an information service provider, such as information service provider 316 in FIG. 3. In addition, the write request may be in the form of written updates received from another replica administration agent of a data replica.

Process 800 then makes a determination as to whether an arbitration token is present (step 806). If the process makes the determination that an arbitration token is present, then process 800 calculates an update time window (step 810). The update time window is calculated using an update time window equation such as update time window equation 600 in FIG. 6. Process 800 then updates stored data with incoming data requests until all updates are made or expiration of the time window (step 812).

At the expiration of the update period as calculated in accordance with the update time window equation, process 800 makes the determination as to whether the write is completed (step 814). If process 800 makes the determination that the write has been completed during the update time window, then process 800 updates the arbitration token (step 818). In an illustrative embodiment, the process updates the arbitration token to indicate that the write was completed. Additionally, a weight assigned to the data replica may be incremented or decremented. If the replica administration agent uses less than the quality of service (QoS) specified time for completing updates, the agent reduces the weight by one. If the replica administration agent does not complete all the updates within the quality of service specified time, the agent increases the weight by one.

The process then transmits the arbitration token to the next replica administration agent specified in the arbitration token (step 820). In addition, process 700 broadcasts all written updates due to requests from information service providers to other replica administration agents (step 822) and terminates thereafter (step 824).

Returning now to step 806, if the process makes the determination that the arbitration token is not present, then process 800 queues the update request in a data cache (step 808). The data cache is a data cache such as data cache 418 in FIG. 4. The queued update request is added to set of write requests and written to stored data when an arbitration token is present. After queuing the update request, process 800 returns to step 806.

At step 814, if the process makes the determination that the write has not been completed during the update time window, process 800 queues the unwritten write requests to a data cache (step 816) and then updates the arbitration token at step 818 as before. During this updating step, process 800 increments the weight of the data replica in which this process is being executed. In another embodiment, process 800 only increments the weight of the data replica after a threshold number of write requests has been incomplete.

Figure 9:
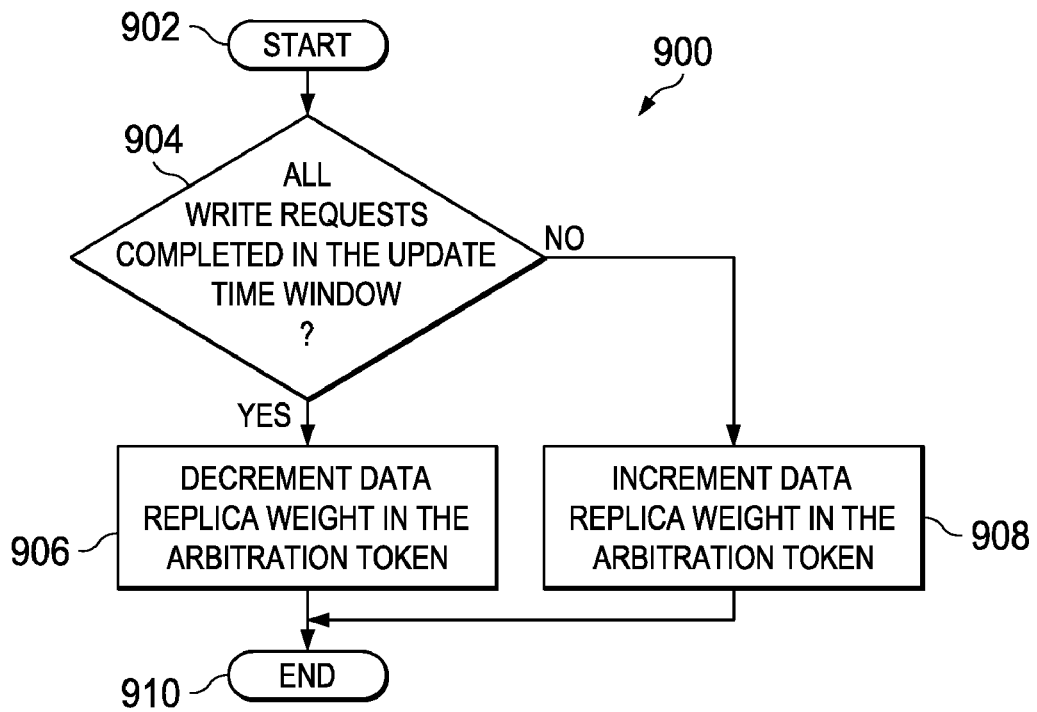
FIG. 9 is a flowchart of a process for updating a weight in an arbitration token of FIG. 7, in accordance with an illustrative embodiment.

With reference to FIG. 9, a flowchart of a process for updating a weight in an arbitration token of FIG. 7 in accordance with an illustrative embodiment is presented. The process in FIG. 9 may be performed by a software component, such as replica administration agent 416 in FIG. 4.

Process 900 begins (step 902) and determines whether all write requests have been completed in the update time window (step 904). If process 900 makes a determination that all the write requests have not been made during the update time window, then process 900 increments the data replica weight in the arbitration token (step 908) and terminates thereafter (step 910). However, if process 900 makes the determination that all the write requests have been made during the update time window, then process 900 decrements the data replica weight in the arbitration token (step 906), and process 900 terminates thereafter (step 910). As previously indicated, in one embodiment, incrementing and decrementing of the data replica weight in the arbitration token may occur after a threshold of write attempts have been made.

Figure 10:
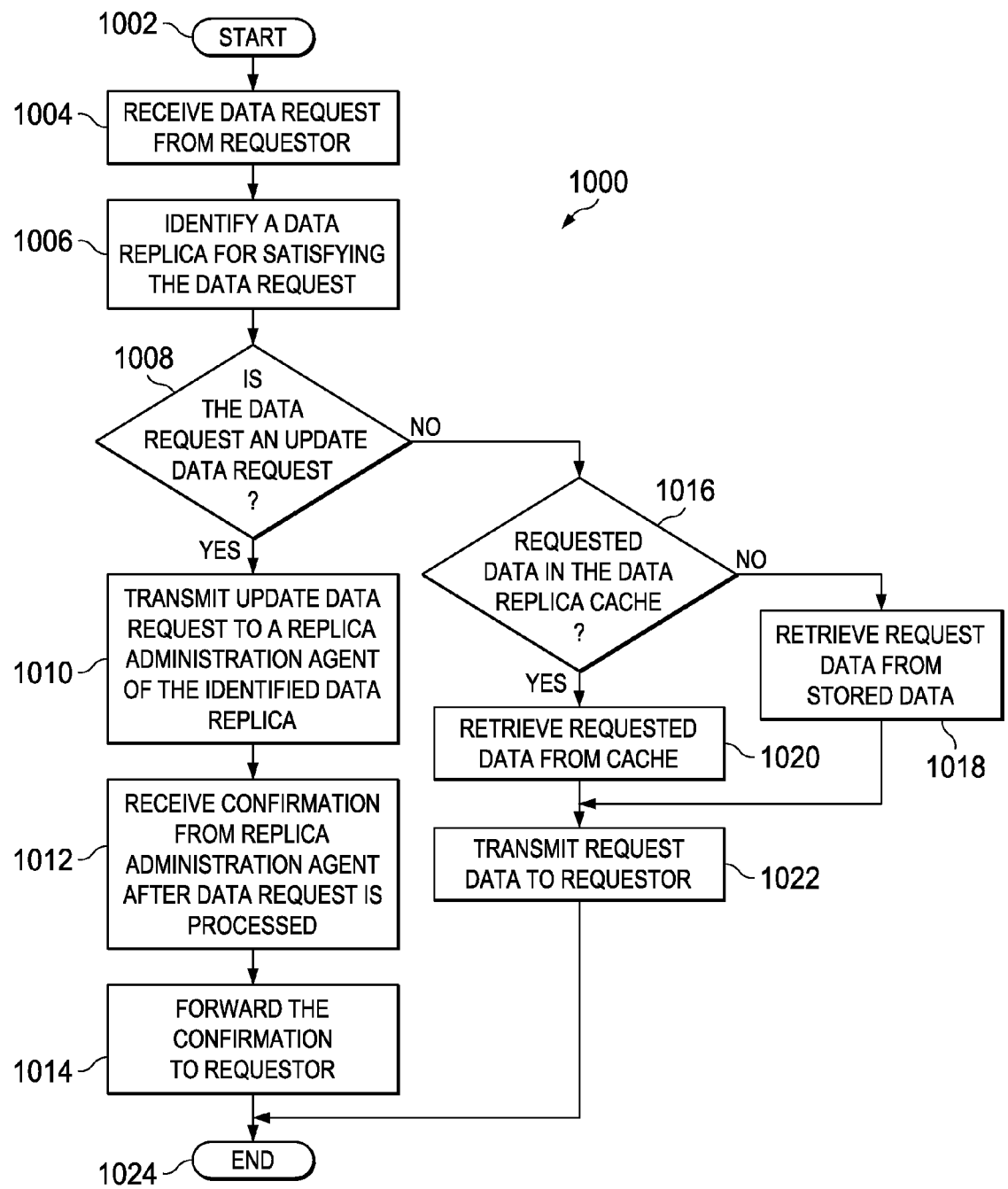
FIG. 10 is a flowchart of a process for controlling a data request for a set of data replicas of FIG. 3, in accordance with an illustrative embodiment.

With reference to FIG. 10, a flowchart of a process for controlling a data request for a set of data replicas of FIG. 3, in accordance with an illustrative embodiment, is presented. Process 1000 may be implemented in a software component, such as information service provider 316 in FIG. 3.

Process 1000 begins (step 1002) and receives a data request from a requestor (step 1004). The requestor may be a client, such as client 102 in FIG. 1 or client 302 of FIG. 3. From the request, the information service provider identifies a data replica for satisfying the data request (step 1006). The data replica may be identified according to previously defined criteria including geographic proximity, most recently used, and data content.

A determination is made as to whether the data request is an update data request (step 1008). Responsive to the data request being an update data request, a "yes" is obtained. Responsive to the data request not being an update data request, a "no" is obtained. When a "no" is obtained in step 1008, a determination as to whether data requested is in the data replica cache (step 1016). Responsive to a determination that data requested is in the data replica cache, a "yes" is obtained. Responsive to a determination that data requested is not in the data replica cache, a "no" is obtained.

When a "no" is obtained in step 1016, retrieve request data from stored data is performed (step 1018). Data that is not in the cache may typically be located in the stored data portion of the data replica. The requested data is transmitted to requestor is performed to return the result (step 1022) with process 1000 terminating thereafter (step 1024). When a "yes" is obtained in step 1016, the data is in the cache and retrieve requested data from cache is performed (step 1020). The requested data is transmitted to the requestor is performed as before.

Returning to step 1008, when a "yes" is obtained in step 1008, transmit update data request to a replica administration agent of the identified data replica is performed (step 1010). The process receives confirmation from replica administration agent after data request is processed (step 1012) provides a confirmation that the write operation was successful and the updates are in place in the data replica. Forward the confirmation to the requestor (step 1014) provides notice to the requestor of the successful write or update operation. Process 1000 terminates thereafter (step 1024).

Figure 11:
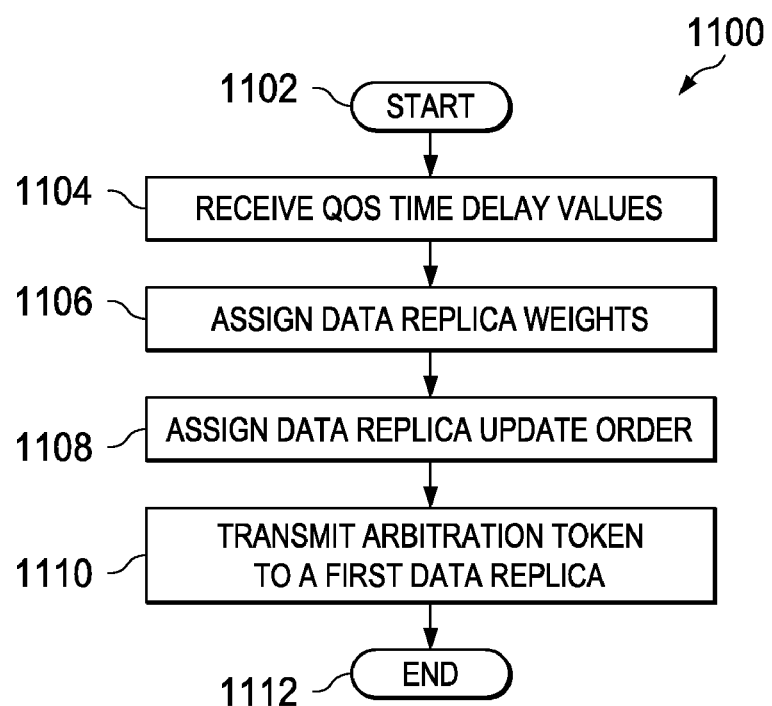
FIG. 11 is a flowchart of a process for initializing an arbitration token of FIG. 3, in accordance with an illustrative embodiment.

With reference to FIG. 11, a flowchart of a process for initializing an arbitration token of FIG. 3, in accordance with an illustrative embodiment, is presented. The process in FIG. 11 may be implemented in a software component such as administration server 318 in FIG. 3.

Process 1100 begins (step 1102) and receives quality of service time delay values (step 1104). The quality of service time delay values are quality of service time delay values such as the quality of service time delay values stored in quality of service time delay column 506 of arbitration token 500 in FIG. 5.

Process 1100 then assigns any data replica weights (step 1006) followed by assigning a data replica update order (step 1108). The assignment of an update order and/or the data replica weights may be made pursuant to input provided by a systems administrator. Alternatively, the assignment of the update order and/or the data replica weights may be made by an administration server according to default values maintained in a resource, property or configuration file. Process 1100 then transmits the arbitration token to the first data replica listed in the update order (step 1110) and terminates thereafter (step 1112).

Thus embodiments illustrate a capability for controlling update of stored data in a set of data replicas, by receiving a data request from a requester and identifying a data replica to resolve the data request to create an identified data replica. Responsive to a determination that the data request is an update data request, transmitting the update data request to a replica administration agent of the identified data replica and responsive to the presence of the arbitration token updating the data of the identified data replica. Upon completion of the update, receiving confirmation from the replica administration agent, and forwarding the confirmation to the requester. The updates from one data replica are thus propagated to other data replicas in a predetermined order. The update process is further controlled using the update time window at each data replica.

The flowchart and block diagrams in the figures illustrate the architecture, functionality, and operation of possible implementations of systems, methods, and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer-implemented method for controlling a plurality of updates of stored data in a plurality of data replicas, the computer-implemented method comprising:
    initializing an arbitration token specifying an order in which the arbitration token is to be passed to each replica administration agent in the plurality of data replicas;
    responsive to receiving a data request in a memory from a requestor, identifying a data replica, that is next in line to receive the arbitration token, to resolve the data request to form an identified data replica;
    transmitting an update data request to a replica administration agent of the data replica if the data request is an update data request;
    determining whether the arbitration token is present in the replica administration agent of the data replica;
    responsive to a determination that the arbitration token is present in the replica administration agent of the data replica, updating the data, by the replica administration agent, in the identified data replica in an amount of time permitted by the arbitration token;
    transmitting an updated arbitration token to a next replica administration agent in the plurality of data replicas in an order specified in the arbitration token;
    determining the order from a plurality of entries in a data replication column, each of the plurality of entries corresponding to a particular data replica of the plurality of data replicas identified in a data replica identity column, the plurality of entries indicating the order in which the arbitration token is passed between the plurality of data replicas, wherein the data replication column and the data replica identity column are in a table in the arbitration token;
    responsive to a determination that the data request is an update data request, calculating the amount of time by multiplying a quality of service time delay value times a data replica weight to get a product and dividing the product by a data replica weight of a highest weighted data replica, wherein the quality of service time delay value is retrieved from a quality of service time delay column in a table and the data replica weight is retrieved from a data replica weight column in the table;
    responsive to a determination that the data request is not an update data request, determining whether requested data of the data request is in a cache of the identified data replica;
    responsive to a determination that the requested data is in the cache, retrieving the requested data from the cache; and
    transmitting the requested data to the requestor through a communications unit.

2. The computer-implemented method of claim 1, wherein responsive to a determination that the requested data is not in the cache:
    retrieving the requested data from stored data on a storage device; and
    transmitting the requested data to the requestor.

3. The computer-implemented method of claim 1, further comprising:
responsive to a determination that the arbitration token is not present in the replica administration agent of the data replica, queuing the update data request in a cache.

4. The computer-implemented method of claim 1, wherein updating the data of the identified data replica further comprises:
receiving an update confirmation from the replica administration agent;
forwarding the update confirmation to the requestor;
updating the arbitration token to form the updated arbitration token; and
broadcasting all written updates to all replica administration agents.

5. The computer-implemented method of claim 4, wherein updating the arbitration token further comprises:
receiving the quality of service time delay value;
assigning a data replica update order;
assigning data replica weight; and
determining the data replica weight of the highest weighted data replica.

6. The computer-implemented method of claim 1, wherein updating the data of the identified data replica further comprises:
determining whether all write requests completed in the amount of time;
responsive to completion of all write requests completed in the amount of time, decrementing a data replica weight; and
responsive to non-completion of all write requests completed in the amount of time, incrementing the data replica weight.

7. A data processing system for controlling update of stored data in a plurality of data replicas, the data processing system comprising:
a bus;
a memory connected to the bus, wherein the memory contains computer-executable instructions;
a processor unit, connected to the bus, wherein the processor unit executes the computer-executable instructions to direct the data processing to:
initialize an arbitration token specifying an order in which the arbitration token is to be passed to each replica administration agent in the plurality of data replicas;
responsive to receiving a data request from a requestor, identify a data replica to resolve the data request to form an identified data replica;
transmit an update data request to a replica administration agent if the data request is an update data request;
determine whether the arbitration token is present in the replica administration agent of the data replica; and
responsive to a determination that the arbitration token is present in the replica administration agent of the data replica, update the data in the identified data replica by the replica administration agent in an amount of time permitted by the arbitration token; and
transmitting an updated arbitration token to a next replica administration agent in the plurality of data replicas in the order specified in the arbitration token;
determining the order from a plurality of entries in a data replication column, each of the plurality of entries corresponding to a particular data replica of the plurality of data replicas identified in a data replica identity column, the plurality of entries indicating the order in which the arbitration token is passed between the plurality of data replicas, wherein the data replication column and the data replica identity column are in a table in the arbitration token;
determining whether the data request is an update data request;
responsive to a determination that the data request is an update data request, calculating the amount of time by multiplying a quality of service time delay times a data replica weight to get a product and dividing the product by a data replica weight of a highest weighted data replica, wherein the quality of service time delay value is retrieved from a quality of service time delay column in the table and the data replica weight is retrieved from a data replica weight column in the table;
responsive to a determination that the data request is not an update data request, determining whether requested data of the data request is in a cache of the identified data replica;
responsive to a determination that the requested data is in the cache, retrieving the requested data from the cache; and
transmit the requested data to the requestor.

8. The data processing system of claim 7, wherein the processor unit executes the computer-executable instructions responsive to a determination that the requested data is not in the cache to direct the data processing to:
retrieve the requested data from stored data on a storage device; and
transmit the requested data to the requestor through a communications unit.

9. The data processing system of claim 7, wherein the processor unit executes the computer-executable instructions responsive to a determination that the arbitration token is not present in the replica administration agent of the data replica, to direct the data processing to queue the update data request in a cache.

10. The data processing system of claim 7, wherein the processor unit executes the computer-executable instructions to update the data of the identified data replica further comprises:
receive an update confirmation from the replica administration agent;
forward the update confirmation to the requestor;
update the arbitration token to form the updated arbitration token; and
broadcast all written updates to all replica administration agents.

11. The data processing system of claim 10, wherein the processor unit executes the computer-executable instructions to direct the data processing to update the arbitration token further comprises:
receive the quality of service time delay value;
assign a data replica update order;
assign the data replica weight; and
determine the data replica weight of the highest weighted data replica.

12. The data processing system of claim 7, wherein the processor unit executes the computer-executable instructions to direct the data processing to update the data of the identified data replica further comprises:
determine whether all write requests completed in the amount of time;
responsive to completion of all write requests completed in the amount of time, decrement a data replica weight; and
responsive to non-completion of all write requests completed in the amount of time, increment the data replica weight.

13. A computer program product for controlling update of stored data in a plurality of data replicas, the computer program product comprising:

a non-transitory computer-recordable storage medium containing computer-executable instructions stored thereon, the computer-executable instructions comprising:

computer-executable instructions for initializing an arbitration token specifying an order in which the arbitration token is to be passed to each replica administration agent in the plurality of data replicas;

computer-executable instructions responsive to receiving a data request from a requestor, for identifying a data replica to resolve the data request to form an identified data replica;

computer-executable instructions for transmitting an update data request to a replica administration agent of the data replica if the data request is an update data request;

computer-executable instructions for determining whether the arbitration token is present in the replica administration agent of the data replica;

computer-executable instructions responsive to a determination that the arbitration token is present in the replica's administration agent of the data replica, for updating the data in the identified data replica by the replica administration agent in an amount of time permitted by the arbitration token;

computer-executable instructions for transmitting an updated arbitration token to a next replica administration agent in the plurality of data replicas in the order specified in the arbitration token;

computer-executable instructions for determining the order from a plurality of entries in a data replication column, each of the plurality of entries corresponding to a particular data replica of the plurality of data replicas identified in a data replica identity column, the plurality of entries indicating the order in which the arbitration token is passed between the plurality of data replicas, wherein the data replication column and the data replica identity column are in a table in the arbitration token;

computer-executable instructions for determining whether the data request is an update data request;

computer-executable instructions responsive to a determination that the data request is an update data request, for calculating the amount of time by multiplying a quality of service time delay times a data replica weight to get a product and dividing the product by a data replica weight of a highest weighted data replica, wherein the quality of service time delay value is retrieved from a quality of service time delay column in the table and the data replica weight is retrieved from a data replica weight column in the table;

computer-executable instructions responsive to a determination that the data request is not an update data request, for determining whether requested data of the data request is in a cache of the identified data replica;

computer-executable instructions responsive to a determination that the requested data is in the cache, for retrieving the requested data from the cache; and computer-executable instructions for transmitting the requested data to the requestor.

14. The computer program product of claim 13, wherein computer-executable instructions responsive to a determination that the requested data is not in the cache further comprise:

computer-executable instructions for retrieving the requested data from stored data on a storage device; and computer-executable instructions for transmitting the requested data to the requestor through a communications unit.

15. The computer program product of claim 13, further comprising;

computer-executable instructions, responsive to a determination that the arbitration token is not present in the replica administration agent of the data replica, for queuing the update data request in a cache.

16. The computer program product of claim 13, wherein computer-executable instructions for updating the data of the identified data replica further comprises:

computer executable instructions for receiving an update confirmation from the replica administration agent;

computer-executable instructions for forwarding the update confirmation to the requestor;

computer-executable instructions for updating the arbitration token to form the updated arbitration token; and computer-executable instructions for broadcasting all written updates to all replica administration agents.

17. The computer program product of claim 13, wherein computer-executable instructions for updating the data of the identified data replica further comprises:

computer-executable instructions for determining whether all write requests completed in the amount of time;

computer-executable instructions responsive to completion of all write requests completed in the amount of time, for decrementing a data replica weight; and computer-executable instructions responsive to non-completion of all write requests completed in the amount of time, for incrementing the data replica weight.

* * * * *